United States Patent Office 3,542,540
Patented Nov. 24, 1970

3,542,540
CARBANION LEACHING OF HEAVY METAL ORES
Harold J. Heinen, Reno, Judith A. Eisele, Verdi, Don H. Baker, Jr., Reno, and Bernard J. Scheiner, Sparks, Nev., assignors to the United States of America as represented by the Secretary of the Interior
No Drawing. Filed Oct. 30, 1968, Ser. No. 771,997
Int. Cl. C22b 11/08, 15/08, 23/011
U.S. Cl. 75—101                4 Claims

ABSTRACT OF THE DISCLOSURE

Gold or other heavy metals such as silver, copper, nickel, cobalt, zinc or cadmium are leached from their respective ore materials with an aqueous solution of a compound which forms, in solution, carbanions that are derived by the loss of a proton from a saturated carbon, which carbanion has the formula $CR_3^-$ or $CHR_2^-$ where no C—R bond is broken during ionization, where each R group is the same or different and where each is a negative inductive group such as CN, COOH, $CONH_2$, etc. Malononitrile, potassium cyanoform and bromomalononitrile are exemplary compounds which supply such carbanions. The pH of the mixture of leach solution and ore is maintained at at least 7.

This invention, which relates to a process for extracting heavy metals such as gold, silver, copper, nickel, cobalt, cadmium or zinc from their respective ores, resulted from work done by the Bureau of Mines in the U.S. Department of the Interior, and domestic title to the invention is in the Government.

Since the beginning of the 20th century, practically all the leaching of gold ores has been by cyanidation using sodium, potassium, or calcium cyanides. During cyanidation, losses of cyanide occur by mechanical and chemical means and present a potential occupational hazard. For example, hydrolysis of NaCN to form poisonous HCN may occur as the result of the $CO_2$ contained in the air used to agitate the ore or as the result of humic acids present in surface ores. Mechanical losses of cyanide due to disposal of mill tailings occasionally have resulted in pollution of streams and death to cattle and wildlife.

It has been proposed to employ alphahydroxynitriles as the leaching agent (U.S. Pat. No. 2,829,045). However, these compounds also have a serious disadvantage in that they readily hydrolyze in water, forming negative $CN^-$ ion or HCN.

We have now discovered a leaching medium which is much less hazardous, which is capable of higher gold extractions from refractory carbonaceous ores, and which is capable of extracting other heavy metal values such as silver, copper, nickel, cobalt, cadmium and zinc. Generally, our process comprises employing as the leaching medium an aqueous solution of a compound which ionizes in such solution to form a carbanion that is derived by the loss of a proton from a saturated carbon which carbanion has the formula $CR_3^-$ or $CHR_2^-$ where no C—R bond is broken during ionization, where each R is the same or different and each is a negative inductive group such as CN, COOH, $CONH_2$, HCO, $HC=CH_2$, $C\equiv CH$, $NO_2$, F, Cl, Br, COOX, XCO, OX, SX, $XC=CX_2$, where X is any alkyl or aromatic group such as $CH_3$, $C_2H_5$, $C_6H_5$, etc. During leaching, the pH of the ore-leach solution mixture is maintained at at least 7, preferably at least 8. Exemplary compounds which supply such carbanions in solution are malononitrile ($CH_2(CN)_2$), potassium syanoform ($KC(CN)_3$), and bromo-malononitrile ($BrCH(CN)_2$).

It is believed that the success of the leaching medium of the present invention is based on the ionization theory of carbanion-supplying compounds. For example, investigators have shown that malononitrile ionizes as follows:

$$CH_2(CN)_2 \rightleftharpoons CH(CN)_2^- + H^+$$

Upon the addition of alkaline solutions, this reaction shifts to the right and forms a high concentration of $CH(CN)_2^-$ carbanions. The stability of such carbanions is due to resonance stabilization (J. Phys. Chem., vol. 67, April 1963, pp. 737–744). These stable ions are strong nucleophilic reagents which it is believed attack the abovementioned metals in their respective ore materials, and combine with the metal to form salts. So long as the resultant metal carbanion salt is soluble in the leaching reagent, then the metal can be readily extracted from its ore material.

It is therefore an object of the present invention to employ carbanions as an ore material leaching agent to extract metals such as gold, silver, copper, nickel, cobalt, cadmium and zinc. Another object is to extract such metals without forming HCN. A further object is to obtain higher gold extractions from its ores. A still further object is to employ an aqueous solution (at least a pH of 7, preferably at least 8) of malononitrile, bromomalononitrile or alkali syanoform as a gold, silver, copper, nickel, cobalt, cadmium or zinc leaching medium.

Other objects and advantages will be obvious from the following more detailed description of the invention.

In the practice of the invention conventional leaching techniques are employed. Alkaline reagents are used to adjust the pH of the leach solution. Such reagents include alkali metal and alkaline earth metal oxides and hydroxides, ammonium hydroxide, ammonium and alkali metal carbonates and bicarbonates.

As to more specific leaching conditions, they will widely vary depending upon the specific metal being leached, the mineralogical composition of the ore material, the size of the metal particles in the material, and the metal's association with gangue materials. Thus, it is not feasible to prescribe a set of leaching conditions which would be universally applicable.

The following examples illustrate different methods for obtaining optimum gold extraction from two types of ore when employing malononitrile. Each operation was conducted at ambient temperature and atmospheric pressure.

EXAMPLE 1

An oxidized siliceous ore containing very finely disseminated gold and assaying 0.40 oz. Au/ton was ground to minus 100 mesh and agitated for 24 hours with a 0.05 percent (by weight) aqueous malononitrile solution containing varying amounts of lime or nitric acid to vary the pH of the resulting pulp. Such extraction was carried out with 300 ml. leach solution per 100 gms. of ore. The results are shown in Table 1.

TABLE 1

| Test No. | Percent lime or acid in leach solution | pulp pH | Assay of residue, oz. Au/ton | Au extraction, percent |
|---|---|---|---|---|
| 1 | 0.2 CaO | 12 | 0.02 | 95.0 |
| 2 | 0.05 CaO | 8 | 0.02 | 95.0 |
| 3 | 0.01 CaO | 7 | 0.34 | 10.0 |
| 4 | 1.0 $HNO_3$ | 6 | 0.38 | 5.0 |

EXAMPLE 2

The ore employed in Example 1 was treated with leach solutions having varying amounts of lime and malononitrile under the same leaching procedures as set forth in Example 1 and the following results were obtained:

TABLE 2

| Test No. | Composition of leach solution | | pH or pulp | Gold extraction, percent |
| --- | --- | --- | --- | --- |
| | CaO, percent | $CH_2(CN)_2$, percent | | |
| 1 | 0.0 | 1.0 | 7 | 55.0 |
| 2 | 0.01 | 0.01 | 7 | 0.0 |
| 3 | 0.01 | 0.05 | 7 | 10.0 |
| 4 | 0.01 | 1.0 | 7.5 | 85.0 |
| 5 | 0.05 | 0.05 | 8 | 95.0 |
| 6 | 0.1 | 0.01 | 11 | 60.0 |
| 7 | 0.25 | 0.01 | 12 | 95.0 |

EXAMPLE 3

A refractory carbonaceous gold-bearing shale assaying 0.24 oz. Au/ton was ground to minus 100-mesh and agitated with an aqueous leach solution containing 0.05% malononitrile and 0.1% lime. The leaching procedure was the same as that set forth in Example 1. A gold extraction of 58.3% was obtained. A parallel test substituting NaCN for the malononitrile was made and a gold extraction of 35.0% was obtained. Ultraviolet spectrophotometric analysis showed that gold malononitrile is a different type of compound than the gold cyanide complex $Au(CN)_2^-$.

EXAMPLE 4

An ore, the same as that employed in Example 3, was ground to minus 100-mesh with kerosene to coat or saturate the carbonaceous matter so it would have less tendency to absorb the dissolved gold during the leaching operation. The ground ore then was leached, in the manner set forth in Example 1, with an aqueous solution containing 0.1% malononitrile and 0.17% CaO. Gold extraction was 91.8%. Under the same conditions, using 0.1% NaCN, 75.0% of the gold was extracted.

Examples 1 and 2 demonstrate the importance of pulp pH, while Examples 3 and 4 show the superiority of malononitrile over sodium cyanide for extracting gold from refractory carbonaceous gold-bearing shale.

Malononitrile has also exhibited good sensitivity with regard to extracting copper and silver from their ores. However, in copper extraction tests on oxide ores with calcareous gangue, the resulting copper malononitrile salts were not highly soluble in aqueous solutions. Therefore, it is necessary to simultaneously strip the copper from the leach solution to obtain optimum extraction. On the other hand, carbanions containing $NH_2$ groups rather than CN groups form salts with copper which are substantially soluble in the leach solution.

Separation of the metal from the metal-carbanion salt solution formed during the practice of the present invention can be accomplished by employing those techniques previously used in cyanidation procedures. That is, another metal which more readily combines with the carbanion can be added to the salt solution to precipitate the desired metal.

As indicated previously, one of the advantages of the present invention is that toxic HCN is not formed during the process, even if the carbanion contains CN groups. This results from the fact that the CN-containing carbanions of the present invention do not hydrolyze or form $CN^-$.

The process of the present invention need not be fully substituted for cyanide (such as NaCN) treatment. Instead, it can be serially combined with such cyanide treatment.

What is claimed is:

1. A process for leaching a metal selected from the group consisting of gold, silver, copper, nickel, cobalt, cadmium and zinc from its respective ore material comprising maintaining a pH of at least 7 during leaching, and employing as the leaching medium an aqueous solution of a compound selected from the group consisting of malononitrile, bromo-malononitrile and alkali cyanoform, and recovering said metal from the solution.

2. The process of claim 1 wherein said pH is at least 8.

3. The process of claim 1 where said ore material is a gold-bearing ore material.

4. The process of claim 3 wherein said pH is at least 8.

References Cited

UNITED STATES PATENTS

| 2,129,700 | 9/1938 | MacAfee | 75—105 |
| 2,829,045 | 4/1958 | Carpenter et al. | 75—105 |
| 3,189,435 | 6/1965 | Lower | 75—106 X |

FOREIGN PATENTS

| 663,088 | 5/1963 | Canada. | |

L. DEWAYNE RUTLEDGE, Primary Examiner

G. T. OZAKI, Assistant Examiner

U.S. Cl. X.R.

75—101, 107, 109, 117, 118, 119, 120, 121; 260—429, 429.9, 430, 438.1, 439